United States Patent
Stambek et al.

(10) Patent No.: US 7,887,422 B2
(45) Date of Patent: Feb. 15, 2011

(54) UNIVERSAL JOINT WITH BEARING CUP RETENTION MECHANISM

(75) Inventors: Joel G. Stambek, Decatur, MI (US); Robert J. Middleton, Portage, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 462 days.

(21) Appl. No.: 11/888,866

(22) Filed: Aug. 2, 2007

(65) Prior Publication Data

US 2009/0036223 A1    Feb. 5, 2009

(51) Int. Cl.
*F16D 3/42* (2006.01)

(52) U.S. Cl. ................................. 464/130

(58) Field of Classification Search .......... 464/128–130
See application file for complete search history.

(56) References Cited

U.S. PATENT DOCUMENTS

| | | |
|---|---|---|
| 1,216,445 A | 2/1917 | Harrington et al. |
| 1,918,613 A | 7/1933 | Peters |
| 1,993,192 A | 3/1935 | Swenson |
| 1,993,357 A | 3/1935 | Braun et al. |
| 2,037,947 A | 4/1936 | Swenson |
| 2,051,248 A | 8/1936 | Dunn |
| 2,067,286 A | 1/1937 | Pearce |
| 2,117,706 A | 5/1938 | Cutting |
| 2,194,798 A | 3/1940 | Koppel |
| 2,386,754 A | 10/1945 | Ruch |
| 2,512,690 A | 6/1950 | Smith et al. |
| 2,539,387 A | 1/1951 | Alden |
| 2,544,631 A | 3/1951 | Heimann et al. |
| 2,595,787 A | 5/1952 | Heimann et al. |
| 2,660,913 A | 12/1953 | Frisby |
| 2,883,899 A | 4/1959 | Bluth |
| 2,964,928 A | 12/1960 | Marquis |
| 3,062,026 A | 11/1962 | Pitner |
| 3,178,907 A | 4/1965 | Lyons |
| 3,200,615 A | 8/1965 | Stokely |
| 3,214,204 A | 10/1965 | Carter |
| 3,218,692 A | 11/1965 | Kayser |
| 3,324,681 A | 6/1967 | Burns et al. |

(Continued)

FOREIGN PATENT DOCUMENTS

DE    242 457    1/1987

(Continued)

OTHER PUBLICATIONS

International Search Report for International Application No. PCT/US2008/071448, dated Nov. 27, 2008.

*Primary Examiner*—Greg Binda
(74) *Attorney, Agent, or Firm*—Harness, Dickey & Pierce, P.L.C.

(57) ABSTRACT

A universal joint may include a spider, a yoke, a bearing cup, and a retaining member. The spider may include a plurality of trunnions and the yoke may include first and second arms. The first arm may include a first aperture therethrough receiving a first trunnion therein. The first arm may additionally include a first anti-rotation feature. The bearing cup may be disposed in the first aperture and may include a second anti-rotation feature. The retaining member may be located in the first aperture and may be engaged with the first and second anti-rotation features to prevent relative rotation between the bearing cup and the yoke.

21 Claims, 6 Drawing Sheets

U.S. PATENT DOCUMENTS

| | | |
|---|---|---|
| 3,351,127 A | 11/1967 | Skinner, Sr. |
| 3,377,820 A | 4/1968 | Smith |
| 3,460,427 A | 8/1969 | Baumgarten |
| 3,479,840 A | 11/1969 | Meyers |
| 3,492,710 A | 2/1970 | Pitner |
| 3,545,232 A | 12/1970 | Neese et al. |
| 3,595,586 A | 7/1971 | Anderson |
| 3,658,395 A | 4/1972 | Hallerback |
| 3,678,708 A | 7/1972 | Ernst et al. |
| 3,701,189 A | 10/1972 | Kadono et al. |
| 3,764,647 A | 10/1973 | McDow |
| 3,788,100 A | 1/1974 | Pitner |
| 3,792,596 A | 2/1974 | Orain |
| 3,846,995 A | 11/1974 | Mangiavacchi |
| 3,858,413 A | 1/1975 | Nemtsov et al. |
| 3,881,324 A | 5/1975 | Girquis |
| 3,906,746 A | 9/1975 | Haines |
| 3,920,270 A | 11/1975 | Babb, Jr. |
| 3,937,035 A | 2/1976 | Fisher et al. |
| 3,950,834 A | 4/1976 | Pitner |
| 3,958,431 A | 5/1976 | Moring |
| 3,965,701 A | 6/1976 | Orain |
| 3,986,238 A | 10/1976 | Fisher |
| 4,000,628 A | 1/1977 | Funatani et al. |
| 4,006,659 A | 2/1977 | Wurzel et al. |
| 4,021,085 A | 5/1977 | Willyard |
| 4,050,130 A | 9/1977 | Pitner |
| 4,073,162 A | 2/1978 | DeBisschop |
| 4,111,464 A | 9/1978 | Asano et al. |
| 4,138,863 A | 2/1979 | Olson, Sr. |
| 4,151,779 A | 5/1979 | Timmer |
| 4,184,242 A | 1/1980 | Petrie |
| 4,224,806 A | 9/1980 | Kobaysahi |
| 4,242,775 A | 1/1981 | Eickmann |
| 4,280,340 A | 7/1981 | Goguet |
| 4,312,547 A | 1/1982 | Negele et al. |
| 4,343,581 A | 8/1982 | Millheiser |
| 4,366,966 A | 1/1983 | Ratsko et al. |
| 4,436,310 A | 3/1984 | Sawabe et al. |
| 4,436,516 A | 3/1984 | Olschewski et al. |
| 4,440,401 A | 4/1984 | Olschewski et al. |
| 4,445,875 A | 5/1984 | Kosuda et al. |
| 4,478,591 A | 10/1984 | Mangiavacchi |
| 4,507,100 A | 3/1985 | Dore et al. |
| 4,515,574 A | 5/1985 | Mazziotti |
| 4,530,675 A | 7/1985 | Mazziotti |
| 4,540,386 A | 9/1985 | Kampf |
| 4,548,591 A | 10/1985 | Haldric et al. |
| 4,576,382 A | 3/1986 | Scharting et al. |
| 4,582,503 A | 4/1986 | Sherman, II |
| 4,637,806 A * | 1/1987 | Olschewski et al. ......... 464/130 |
| 4,645,474 A | 2/1987 | Olschewski et al. |
| 4,650,440 A | 3/1987 | Fisher |
| 4,707,320 A | 11/1987 | Sherman, II |
| 4,710,150 A | 12/1987 | Mangiavacchi |
| 4,795,401 A | 1/1989 | Ende |
| 4,810,233 A | 3/1989 | Crane, Jr. et al. |
| 4,813,808 A | 3/1989 | Gehrke |
| 4,834,691 A | 5/1989 | Schultze et al. |
| 4,861,315 A | 8/1989 | Mazziotti |
| 4,886,479 A | 12/1989 | Richtmeyer et al. |
| 4,936,133 A | 6/1990 | Orain |
| 4,943,262 A | 7/1990 | Schultze |
| 5,009,628 A | 4/1991 | Rouillot |
| 5,026,324 A | 6/1991 | Schurger et al. |
| 5,201,233 A | 4/1993 | Skinner et al. |
| 5,256,107 A | 10/1993 | Marsumoto et al. |
| 5,279,522 A | 1/1994 | Rouillot et al. |
| 5,342,240 A | 8/1994 | Mazziotti |
| 5,352,079 A | 10/1994 | Croskey |
| 5,370,581 A | 12/1994 | Rohrle et al. |
| 5,374,219 A | 12/1994 | Kohara et al. |
| 5,417,613 A | 5/1995 | Aiken |
| 5,460,573 A | 10/1995 | Krude |
| 5,529,538 A | 6/1996 | Schulz et al. |
| 5,597,356 A | 1/1997 | Rieder |
| 5,613,691 A | 3/1997 | Komai et al. |
| 5,626,520 A | 5/1997 | Mazziotti |
| 5,632,682 A | 5/1997 | Krude et al. |
| 5,647,799 A | 7/1997 | Gall et al. |
| 5,715,600 A * | 2/1998 | Marriott et al. ......... 464/130 X |
| 5,716,277 A | 2/1998 | Reynolds |
| 5,718,464 A | 2/1998 | Mark |
| 5,725,431 A | 3/1998 | Reynolds |
| 5,746,658 A * | 5/1998 | Duggan et al. ............... 464/130 |
| 5,769,723 A | 6/1998 | Faulbecker et al. |
| 5,797,800 A | 8/1998 | Rhoades et al. |
| 5,813,916 A | 9/1998 | Lentini et al. |
| 5,836,078 A | 11/1998 | Aiken et al. |
| 5,865,678 A | 2/1999 | Koedam et al. |
| 5,988,523 A | 11/1999 | Scott |
| 6,050,899 A | 4/2000 | Jones et al. |
| 6,059,663 A | 5/2000 | Jones et al. |
| 6,077,166 A | 6/2000 | Reynolds |
| 6,129,634 A | 10/2000 | Nieman |
| 6,162,126 A | 12/2000 | Barrett et al. |
| 6,168,529 B1 | 1/2001 | Moulinet |
| 6,183,369 B1 | 2/2001 | Faulbecker et al. |
| 6,264,566 B1 | 7/2001 | Nieman et al. |
| 6,280,335 B1 | 8/2001 | Wehner et al. |
| 6,328,654 B1 | 12/2001 | Brisette et al. |
| 6,336,868 B1 | 1/2002 | Kurecka et al. |
| 6,342,012 B1 | 1/2002 | Dorok et al. |
| 6,354,604 B1 | 3/2002 | Nicolai |
| 6,357,757 B1 | 3/2002 | Hibbler et al. |
| 6,398,886 B1 | 6/2002 | Furhmann et al. |
| 6,406,373 B1 | 6/2002 | Gibson |
| 6,428,418 B1 | 8/2002 | Appelt et al. |
| 6,805,635 B1 | 10/2004 | Organ |
| 6,855,059 B2 | 2/2005 | Menosky et al. |
| 6,994,627 B2 | 2/2006 | Menosky et al. |
| 7,025,679 B2 | 4/2006 | Menosky et al. |
| 7,044,859 B2 | 5/2006 | Menosky et al. |
| 2003/0224862 A1 | 12/2003 | Schultze |
| 2004/0127296 A1* | 7/2004 | Gille et al. .................. 464/130 |
| 2004/0204249 A1 | 10/2004 | Grupido |
| 2004/0213490 A1 | 10/2004 | Kruppa |
| 2004/0224778 A1 | 11/2004 | Menosky et al. |
| 2004/0224779 A1 | 11/2004 | Menosky |
| 2005/0130748 A1 | 6/2005 | Menosky et al. |
| 2006/0073901 A1 | 4/2006 | Bommarito |

FOREIGN PATENT DOCUMENTS

| | | |
|---|---|---|
| FR | 1228019 | 8/1960 |
| FR | 1278541 | 12/1961 |
| GB | 469719 | 7/1937 |
| JP | 60-30829 | 2/1985 |
| JP | 61-184224 | 8/1986 |
| JP | 11125263 | 11/1999 |
| KR | 10-0384319 B1 | 5/2003 |

* cited by examiner

UNIVERSAL JOINT WITH BEARING CUP RETENTION MECHANISM

FIELD

The present disclosure relates to vehicle universal joint assemblies, and more specifically to bearing retention mechanisms for universal joint assemblies.

BACKGROUND

The statements in this section merely provide background information related to the present disclosure and may not constitute prior art.

Propshafts are commonly employed for transmitting power from a rotational power source, such as the output shaft of a vehicle transmission, to a rotatably driven mechanism, such as a differential assembly. Generally, propshafts are connected to the rotational power source and rotatably driven mechanism via a constant velocity or universal joint. The universal joint is typically formed from two yokes, a spider that is disposed between the yokes, and bearings that are received on trunnions of the spider.

SUMMARY

A universal joint may include a spider, a yoke, a bearing cup, and a retaining member. The spider may include a plurality of trunnions and the yoke may include first and second arms. The first arm may include a first aperture therethrough receiving a first trunnion therein. The first arm may additionally include a first anti-rotation feature. The bearing cup may be disposed in the first aperture and may include a second anti-rotation feature. The retaining member may be located in the first aperture and may be engaged with the first and second anti-rotation features to prevent relative rotation between the bearing cup and the yoke.

A method of assembling a universal joint assembly may include positioning a spider relative to a yoke, positioning a bearing cup relative to the yoke, and forming a retaining member. Positioning the spider may include locating the spider between first and second arms of the yoke and locating a trunnion of the spider within an aperture extending through the first arm. The bearing cup may be positioned within the aperture and the trunnion may be located therein. The retaining member may be formed in the aperture to engage a first anti-rotation feature on the first arm and a second anti-rotation feature on the bearing cup to prevent relative rotation between the bearing cup and the yoke.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
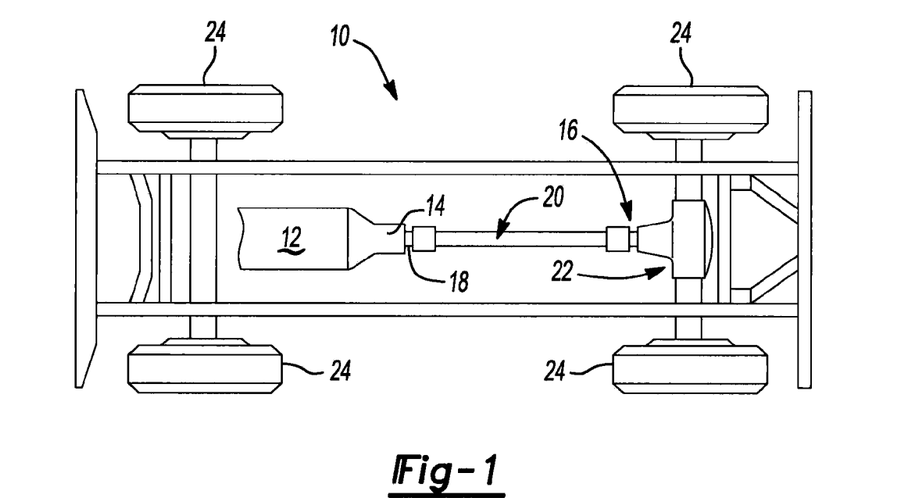
FIG. 1 is a schematic illustration of a vehicle according to the present disclosure.

With reference to FIG. 1, a vehicle 10 may include an engine 12, a transmission 14, and a driveline 16. Transmission 14 may be driven by engine 12. Transmission 14 may include an output 18 and a gear reduction unit (not shown) in driving engagement with driveline 16.

Figure 2:
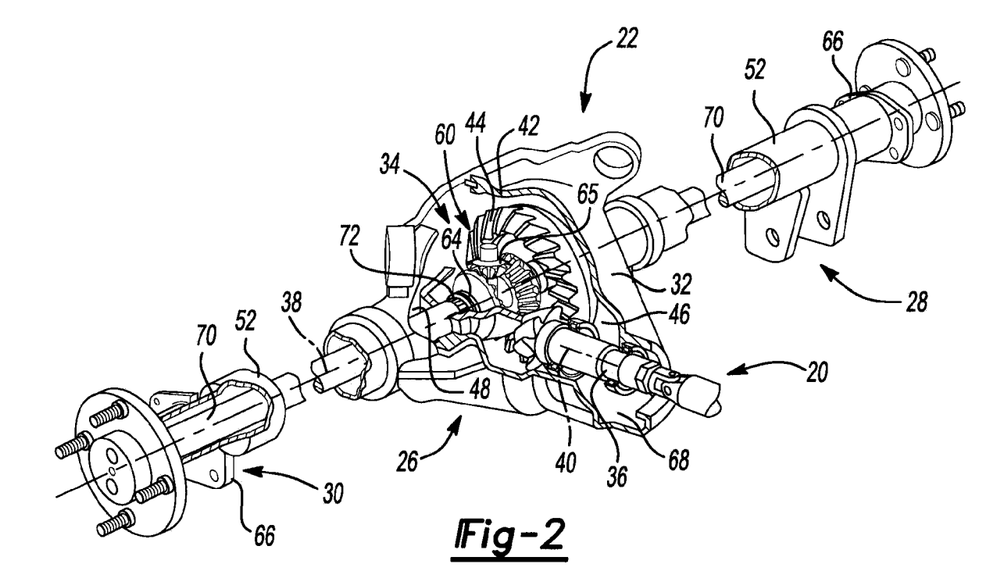
FIG. 2 is a fragmentary perspective cut-away view of a rear axle portion of the vehicle of FIG. 1.

Driveline 16 may include a propshaft assembly 20, a rear axle assembly 22, and wheels 24. Propshaft assembly 20 may be coupled for rotation with transmission output 18. Drive torque may be transmitted from propshaft assembly 20 to rear axle assembly 22 where it may be selectively transmitted to wheels 24. With reference to FIG. 2, rear axle assembly 22 may include a differential assembly 26 and left and right axle shaft assemblies 28, 30.

Differential assembly 26 may include a housing 32, a differential unit 34 and an input shaft assembly 36. Housing 32 may support differential unit 34 for rotation about a first axis 38 and may further support input shaft assembly 36 for rotation about a second axis 40 that may be generally perpendicular to first axis 38.

Housing 32 may include a wall member 42 that defines a central cavity 44 having a left axle aperture 46, a right axle aperture 48 and an input shaft aperture 68. Housing 32 may include a pair of axle tubes 52 that are fixedly mounted to wall member 42. Differential unit 34 may be disposed within central cavity 44 of housing 32 and may include a gearset 60. Gearset 60 may include a first side gear (not shown), a second side gear 64, and a plurality of pinions 65 engaged with the first side gear and second side gear 64. A flange 66, which may be employed to support a brake assembly (not shown), may be coupled to a distal end of both left and right axle shaft assemblies 28, 30.

Input shaft assembly 36 may extend through input shaft aperture 68 and may be supported therein for rotation about second axis 40. Input shaft assembly 36 may be coupled for rotation with propshaft assembly 20 and may transmit drive torque to differential unit 34. More specifically, drive torque received by input shaft assembly 36 may be transmitted to differential unit 34 such that drive torque is distributed to the first side gear and second side gear 64, causing left and right axle shaft assemblies 28, 30 to rotate about first axis 38.

Left and right axle shaft assemblies 28, 30 may each include an axle shaft 70 that is supported for rotation in axle tube 52 about first axis 38. Each of axle shafts 70 may include an externally splined portion 72 that may meshingly engage a mating internally splined portion (not shown) that is formed into first and second side gears 64.

Figure 3:
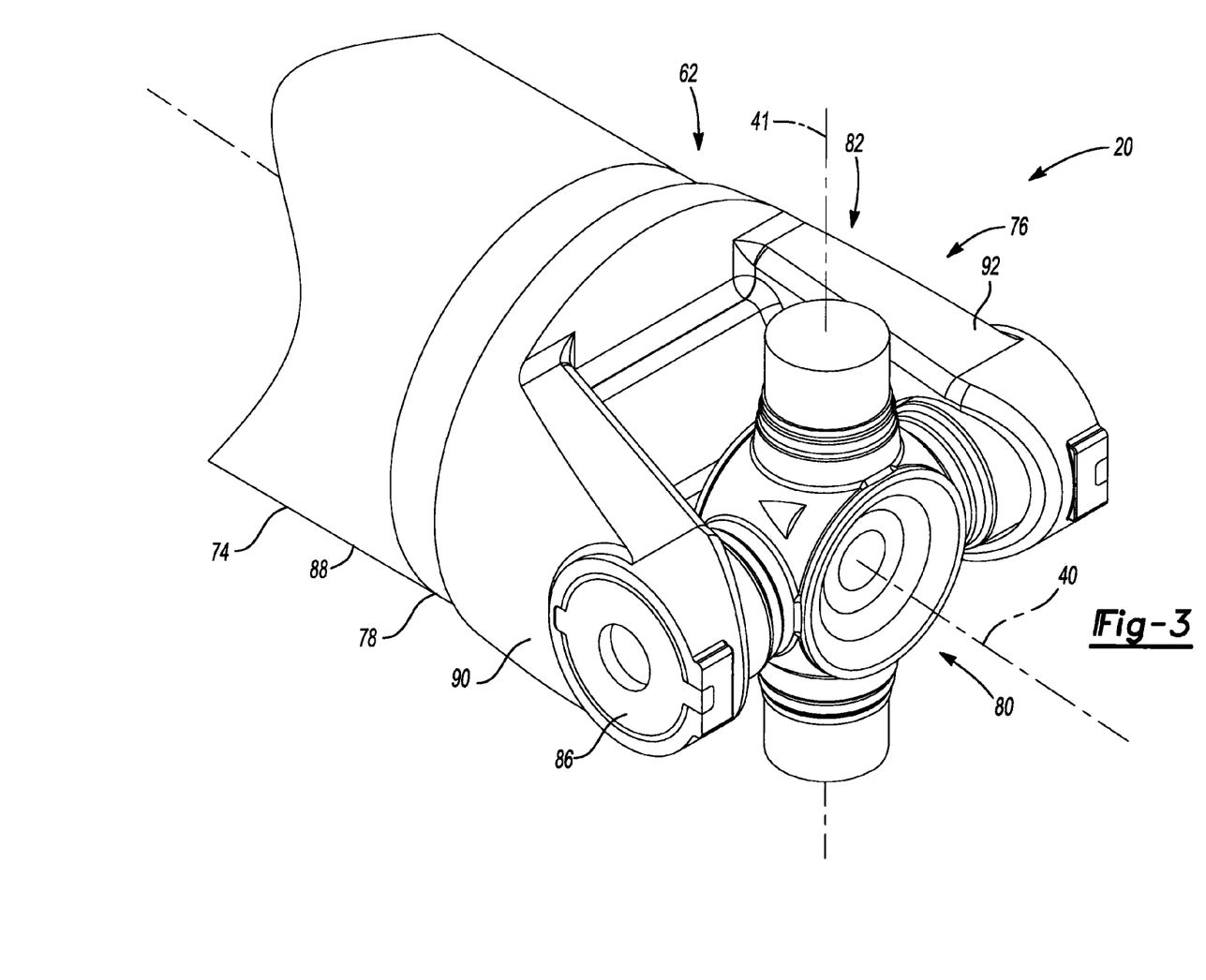
FIG. 3 is a fragmentary perspective view of a propshaft assembly of the vehicle of FIG. 1.
Figure 4:
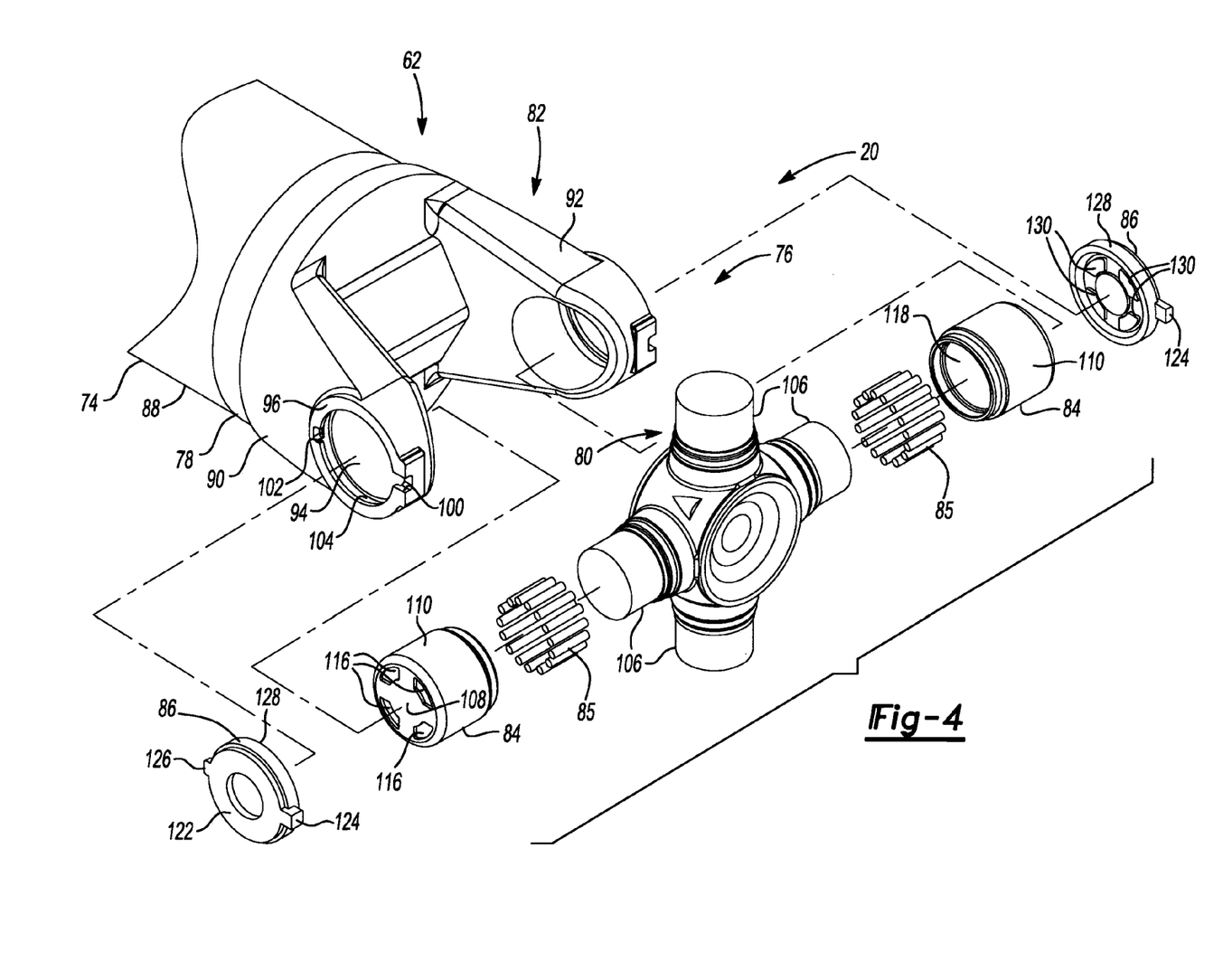
FIG. 4 is a fragmentary exploded perspective view of the propshaft assembly of FIG. 3.
Figure 5:
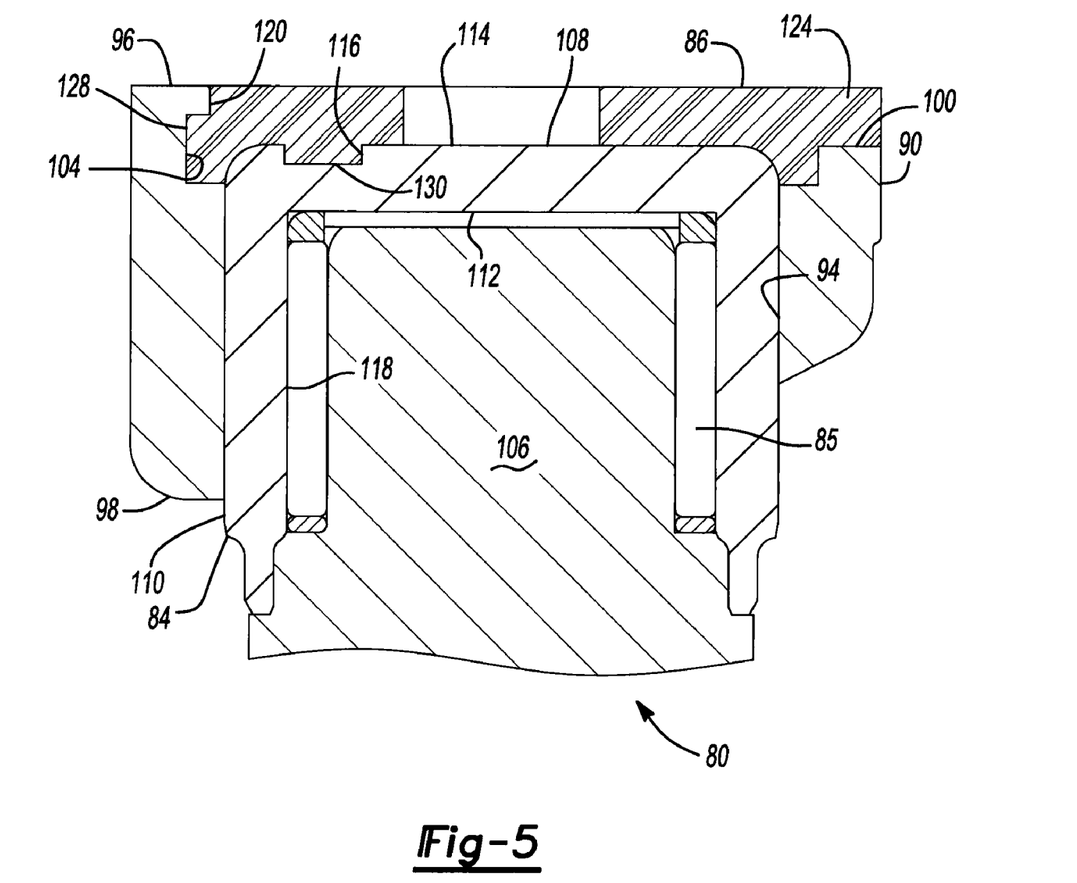
FIG. 5 is a fragmentary sectional view of the propshaft assembly of FIG. 3.

With reference to FIGS. 3-5, an end 62 of propshaft assembly 20 is shown and may include a shaft structure 74 and a universal joint 76. An opposite end of propshaft assembly 20 may be generally similar to end 62. Therefore, it is understood that the description of end 62 applies equally to the opposite end of propshaft assembly 20. A yoke assembly 82 may include a yoke 78 and universal joint 76 that includes a spider 80, a plurality of bearing cups 84, a plurality of roller bearings 85, and a plurality of retaining members 86.

Yoke 78 may be coupled to end 88 of shaft structure 74 with yoke assembly 82 extending therefrom. Yoke assembly 82 may include a pair of arms 90, 92 that are generally similar to one another. Therefore, arm 90 will be described with the understanding that the description applies equally to arm 92.

Arm 90 may include an aperture 94 extending therethrough from a first face 96 to a second face 98 (FIG. 5), first and second recesses 100, 102 forming a first set of anti-rotation features and an annular recess 104 forming an axial retention feature. First and second recesses 100, 102 may be in communication with and may extend radially outwardly from aperture 94 at first face 96. Annular recess 104 may extend into an inner wall of aperture 94 at a location between first and second faces 96, 98 and may be in communication with first and second recesses 100, 102.

Spider 80 may include a plurality of cylindrical projections or trunnions 106 housed within bearing cups 84. One of bearing cups 84 may be located within aperture 94. bearing cup 84 may include an end cap 108 and an annular bearing wall 110 extending from a first side 112 thereof, forming a generally U-shaped cross section. First side 112 of end cap 108 may generally face arm 92 and annular bearing wall 110 may generally extend toward arm 92. A second side 114 of end cap 108 generally opposite to first side 112 may include a series of discrete recesses 116 extending axially into second side 114 to form a second set of anti-rotation features. The recesses 116 can be disposed concentrically about the end cap 108, and thus can be disposed concentrically about a longitudinal axis of an associated trunnion 106. Bearing cup 84 may also include a bore 118 housing trunnion 106 and containing roller bearings 85 that are disposed about trunnion 106.

End cap 108 may be located between first and second faces 96, 98 and may be spaced axially inwardly from first face 96, forming a recess 120 between second side 114 of end cap 108 and first face 96 of arm 90. Retaining member 86 may be located within recess 120. Retaining member 86 may axially and rotationally locate bearing cup 84 relative to yoke assembly 82.

Retaining member 86 may include a body portion 122 having first and second radially outwardly extending protrusions 124, 126, an annular protrusion 128 extending radially outwardly from an outer perimeter thereof, and a series of discrete axially extending protrusions 130. Retaining member 86 may be seated within recess 120. First and second protrusions 124, 126 may be engaged with first and second recesses 100, 102, respectively, to prevent rotation of retaining member 86 relative to arm 90. Annular protrusion 128 may extend into annular recess 104 to prevent axial displacement of retaining member 86 relative to arm 90.

Axially extending protrusions 130 may extend into recesses 116 in end cap 108 to prevent relative rotation between bearing cup 84 and retaining member 86. Since retaining member 86 is axially fixed relative to arm 90, bearing cup 84 may also be rotationally fixed relative to arm 90. Bearing cup 84 may be axially retained between retaining member 86 and trunnion 106. More specifically, axially outward travel of bearing cup 84 may be limited by retaining member 86 and axially inward travel of bearing cup 84 may be limited by trunnion 106.

Figure 6:
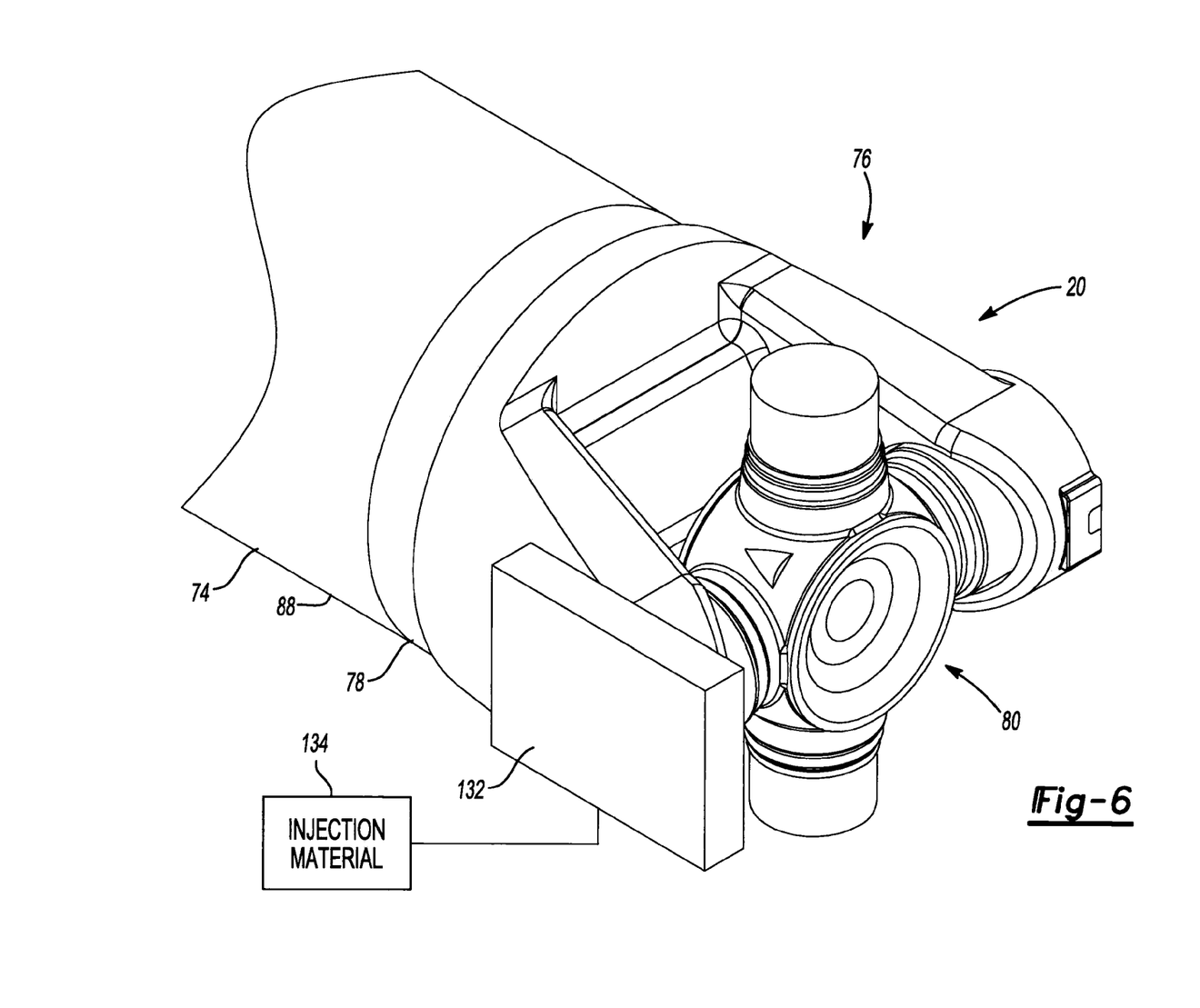
FIG. 6 is a fragmentary perspective view of a propshaft assembly of FIG. 3 including a mold housing.
Figure 7:
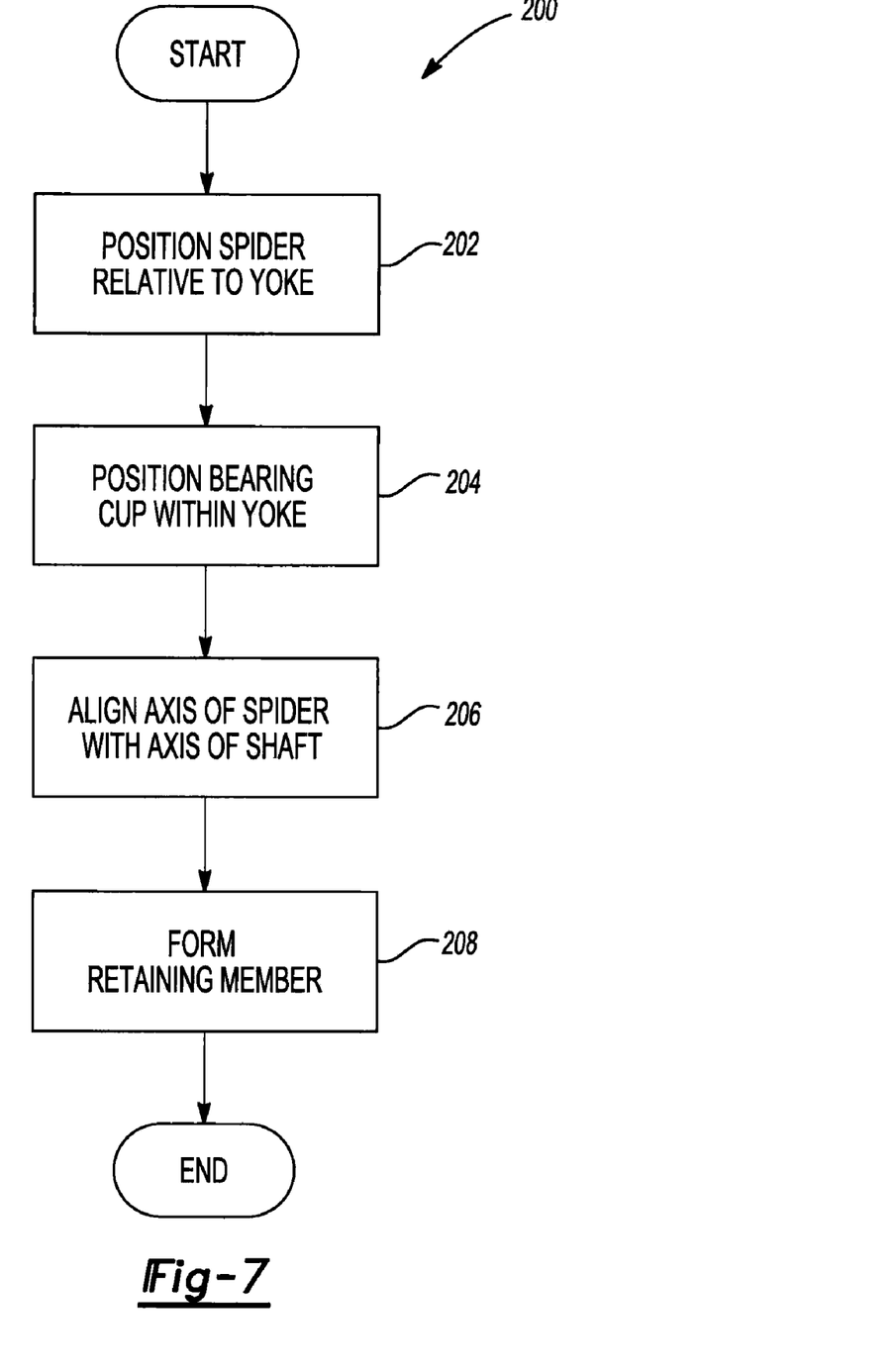
FIG. 7 is a flow diagram illustrating assembly of a universal joint of the propshaft assembly of FIG. 6.

With reference to FIGS. 6 and 7, assembly of universal joint 76 will be described. Flow diagram 200 illustrates assembly of universal joint 76 and may start at step 202 where spider 80 may be positioned relative to yoke assembly 82. Positioning spider 80 may generally include locating trunnion 106 within aperture 94. Once spider 80 is positioned, bearing cup 84 may be positioned within yoke assembly 82, as indicated at step 204. Positioning bearing cup 84 may generally include inserting bearing cup 84 into aperture 94 such that annular bearing wall 110 houses trunnion 106 therein. As indicated at step 206, a third axis 41 of spider 80 may be aligned with second axis 40. Third axis 41 may be defined by a pair of trunnions 106 and may be aligned to be co-planar with second axis 40.

Once spider 80 and bearing cup 84 are located relative to yoke assembly 82 and second and third axes 40, 41 are aligned, retaining member 86 may be formed, as indicated at step 208. Forming retaining member 86 may include positioning a mold housing 132 over first face 96 of arm 90 is in communication with aperture 94. Mold housing 132 may be in communication with a mold material from an injection material source 134 used to form retaining member 86. The mold material may include a variety of plastics, such as a 30 percent long fiber reinforced nylon 6/6.

The mold material may be injected into recess 120 and may generally conform to the geometry of recess 120, including first and second recesses 100, 102 and annular recess 104. As such, retaining member 86 may generally be formed as a unitary member. The mold material may further conform to the geometry on second side 114 of end cap 108, including recesses 116. Forming of retaining member 86 may be completed by curing the mold material within recess 120. Assembly of universal joint 76 may then be complete.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A universal joint, comprising:
   a spider including a plurality of trunnions;
   a yoke including first and second arms, said first arm including a first aperture therethrough receiving a first of said trunnions therein, said first arm including a first anti-rotation feature;
   a bearing cup disposed in said first aperture and including a second anti-rotation feature; and
   a unitarily formed retaining member located in said first aperture and including first and second mating anti-rotation features engaged with said first and second anti-rotation features, respectively, to prevent relative rotation between said bearing cup and said yoke;
   wherein the first anti-rotation feature comprises a recess that is formed in a first face of the first arm and wherein said first and second mating anti-rotation features comprise first and second members that extend axially parallel to a longitudinal axis of the first aperture.

2. The universal joint of claim 1 wherein said bearing cup includes an end cap having an annular bearing wall extending axially from a first side thereof and wherein a second side of said end cap opposite said first side includes said second anti-rotation feature.

3. The universal joint of claim 2 wherein said second anti-rotation feature includes a first recess extending axially into said second side of said end cap.

4. The universal joint of claim 3 wherein said second anti-rotation feature includes first and second discrete recesses extending axially into said second side of said end cap.

5. The universal joint of claim 2 wherein said retaining member covers a portion of said second side of said end cap.

6. The universal joint of claim 5 wherein said retaining member is molded into said first aperture and conforms to said second side of said end cap to engage said second anti-rotation feature.

7. The universal joint of claim 2 wherein said first aperture includes an axial extent defined by said first face and a second face of said first arm, said end cap being located between said first and second faces and said retaining member being located between said second side of said end cap and said first face.

8. The universal joint of claim 7 wherein said recess formed in said first face of said first arm extends radially outwardly from said first aperture.

9. The universal joint of claim 7 wherein said recess is located in a wall of said first aperture at a location between said second side of said end cap and said first face of said first arm, said retaining member extending into said recess to retain said retaining member axially within said first aperture.

10. The universal joint of claim 1 wherein said first mating anti-rotation feature includes said first member which engages said recess in said first arm, and wherein said second mating anti-rotation feature includes said second member engaging a second recess formed in said bearing cup and defining said second anti-rotation feature.

11. The universal joint of claim 1 wherein said retaining member is formed from a polymer material.

12. A universal joint comprising:
a spider having a plurality of trunnions;
a yoke having an arm, the arm including a first aperture formed therethrough for receipt of a first one of the plurality of trunnions therein, the arm further including a first anti-rotation feature and an axial retention recess, the axial retention recess intersecting the first aperture;
a bearing assembly having a bearing cup and a plurality of bearings that are received between the bearing cup and the first one of the plurality of trunnions, the bearing cup having an outer surface with a second anti-rotation feature; and
a member comprising a first mating anti-rotation feature, which is engaged to the first anti-rotation feature to inhibit relative rotation therebetween, a second mating anti-rotation feature, which is engaged to the second anti-rotation feature to inhibit relative rotation therebetween, and a protrusion that is received in the axial retention recess to inhibit relative axial movement of the member;
wherein the first anti-rotation feature comprises a recess that is formed in an outward face of the arm and wherein the axial retention recess is spaced apart from the outward face of the arm.

13. The universal joint of claim 12, wherein one of the second anti-rotation feature and the second mating anti-rotation feature comprises a recess that extends parallel to a longitudinal axis of the first one of the plurality of trunnions.

14. The universal joint of claim 13, wherein the one of the second anti-rotation feature and the second mating anti-rotation feature comprises a plurality of recesses that extend parallel to the longitudinal axis.

15. The universal joint of claim 14, wherein the plurality of recesses are disposed concentrically about the longitudinal axis.

16. The universal joint of claim 12, wherein the bearing cup includes an end member that is disposed axially between a distal end of the first one of the plurality of trunnions and the member and wherein the second anti-rotation feature is integral with the end member.

17. The universal joint of claim 16, wherein the second anti-rotation feature comprises one or more recesses formed into the end member.

18. The universal joint of claim 12, wherein the member is bonded to at least one of the bearing cup and the arm.

19. The universal joint of claim 12, wherein the first and second mating anti-rotation features are interconnected by a body.

20. The universal joint of claim 19, wherein the body is at least partly received in the aperture.

21. A universal joint comprising:
a spider having a plurality of trunnions;
a yoke having an arm, the arm including a first aperture formed therethrough for receipt of a first one of the plurality of trunnions therein, the arm further including a first anti-rotation feature;
a bearing assembly having a bearing cup and a plurality of bearings that are received between the bearing cup and the first one of the plurality of trunnions, the bearing cup having an outer surface with a second anti-rotation feature; and
a member having a first mating anti-rotation feature that is engaged to the first anti-rotation feature to inhibit relative rotation therebetween, the member further comprising a second mating anti-rotation feature that is engaged to the second anti-rotation feature to inhibit relative rotation therebetween;
wherein the bearing cup includes an end member that is disposed axially between a distal end of the first one of the plurality of trunnions and the member and wherein the second anti-rotation feature is integral with the end member.
wherein the second anti-rotation feature comprises one or more recesses formed into the end member and the one or more recesses is partly formed through the end member;
wherein the member is bonded to at least one of the bearing cup and the arm; and
wherein the first and second mating anti-rotation features are interconnected by a body that is at least partly received in the aperture.

* * * * *